(12) United States Patent
Shimizu et al.

(10) Patent No.: US 8,537,526 B2
(45) Date of Patent: Sep. 17, 2013

(54) CYLINDRICAL CAPACITOR EMPLOYING ELECTROLYTE SOLUTION

(75) Inventors: Toshiaki Shimizu, Nara (JP); Toshitaka Hibi, Kyoto (JP); Toshiharu Hirata, Kyoto (JP); Motohiro Sakata, Osaka (JP); Hideo Yokoe, Kyoto (JP)

(73) Assignee: Panasonic Corporation, Osaka (JP)

( * ) Notice: Subject to any disclaimer, the term of this patent is extended or adjusted under 35 U.S.C. 154(b) by 239 days.

(21) Appl. No.: 12/537,866

(22) Filed: Aug. 7, 2009

(65) Prior Publication Data

US 2009/0296316 A1    Dec. 3, 2009

Related U.S. Application Data

(63) Continuation of application No. PCT/JP2008/000194, filed on Feb. 12, 2008.

(30) Foreign Application Priority Data

Feb. 14, 2007    (JP) ................................. 2007-033183

(51) Int. Cl.
*H01G 9/00*    (2006.01)
*H01G 9/10*    (2006.01)
*H05K 5/06*    (2006.01)

(52) U.S. Cl.
USPC ........................................ 361/502; 361/518

(58) Field of Classification Search
USPC ................. 361/502, 511, 512, 517, 518, 519, 361/520, 521
See application file for complete search history.

(56) References Cited

U.S. PATENT DOCUMENTS

| 3,422,319 | A  | * | 1/1969 | Yeamans | 361/518 |
| 6,222,720 | B1 | | 4/2001 | Aoki et al. | |
| 6,282,081 | B1 | * | 8/2001 | Takabayashi et al. | 361/502 |
| 6,456,484 | B1 | | 9/2002 | Matsuoka et al. | |
| 6,596,434 | B1 | * | 7/2003 | Yoshinaka et al. | 429/94 |
| 6,605,382 | B2 | * | 8/2003 | Ruth et al. | 429/94 |
| 6,723,466 | B2 | * | 4/2004 | Oogami et al. | 429/94 |
| 6,896,993 | B2 | * | 5/2005 | Hozumi et al. | 429/130 |
| 7,286,335 | B2 | * | 10/2007 | Hozumi et al. | 361/502 |
| 7,542,266 | B2 | * | 6/2009 | Kim | 361/512 |
| 7,548,410 | B2 | * | 6/2009 | Ueda et al. | 361/540 |

(Continued)

FOREIGN PATENT DOCUMENTS

EP    1 873 798 A1    1/2008
JP    S4980333    7/1974

(Continued)

OTHER PUBLICATIONS

International Search Report for PCT/JP2008/000194.

*Primary Examiner* — David M Sinclair
(74) *Attorney, Agent, or Firm* — Pearne & Gordon LLP

(57) ABSTRACT

A capacitor includes a capacitor element, a bottomed, cylindrical, metallic case, a metallic terminal plate, and a sealing rubber. A flange is provided along the outer circumference of the terminal plate. The flange is brought into contact with the bottom face of the sealing rubber for positioning. The case is wrung from the outside thereof so as to compress the sealing rubber. The sealing rubber has at least one of a ring-shaped top projection wall projecting between the metallic case and the terminal plate on the top face thereof, and a ring-shaped bottom projection wall projecting between the metallic case and the flange on the bottom face thereof.

8 Claims, 8 Drawing Sheets

(56) References Cited

U.S. PATENT DOCUMENTS

| | | | |
|---|---|---|---|
| 7,817,404 B2 * | 10/2010 | Miura et al. | 361/518 |
| 2005/0225926 A1 | 10/2005 | Erhardt et al. | |
| 2006/0156521 A1 | 7/2006 | Miura et al. | |
| 2007/0020518 A1 * | 1/2007 | Bito et al. | 429/181 |

FOREIGN PATENT DOCUMENTS

| | | | | |
|---|---|---|---|---|
| JP | 57-66535 U | | 4/1982 | |
| JP | 59-175553 A | | 10/1984 | |
| JP | 08-017687 A | | 1/1996 | |
| JP | 11-243035 A | | 9/1999 | |
| JP | 2000113866 A | * | 4/2000 | |
| JP | 2000306557 A | * | 11/2000 | |
| JP | 2000-340210 A | | 12/2000 | |
| JP | 2001-68379 A | | 3/2001 | |
| JP | 2005-520344 A | | 7/2005 | |
| JP | 2006-228858 A | | 8/2006 | |
| JP | 2008-098545 A | | 4/2008 | |
| JP | 2008-192894 A | | 8/2008 | |
| WO | WO 2006115111 A1 | * | 11/2006 | |

* cited by examiner

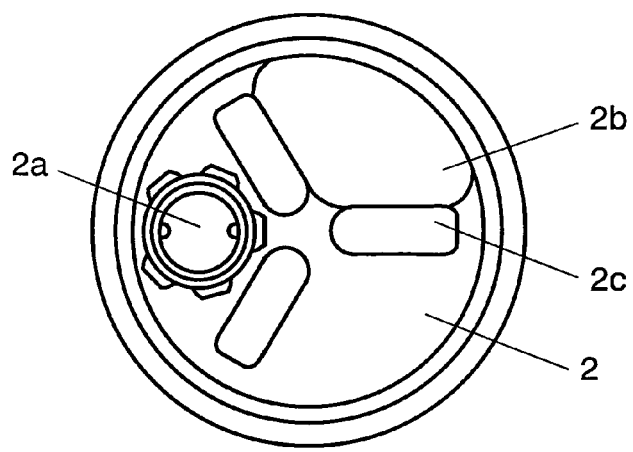
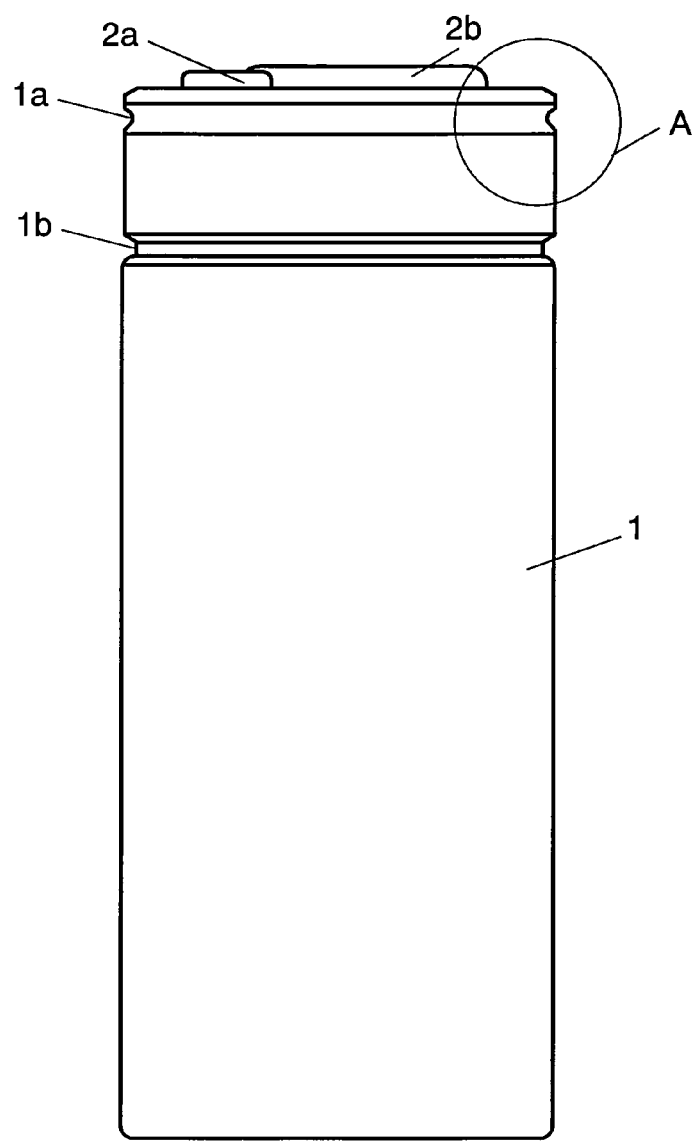

PRIOR ART

CYLINDRICAL CAPACITOR EMPLOYING ELECTROLYTE SOLUTION

BACKGROUND OF THE INVENTION

1. Field of the Invention

The present invention relates to a capacitor for use in various types of electronic devices, on-vehicle devices, or the like.

2. Background Art

FIG. 7 is a sectional view of a typical electric double layer capacitor. As show in FIG. 7, capacitor element 10 has hollow portion 10a. FIG. 8 is a development of a typical electric double layer capacitor element. Capacitor element 10 is formed by winding a pair of positive electrode and a negative electrode each of which has polarized electrode layers 25 formed on current collector 27 made of an aluminum foil so that the positive electrode and the negative electrode are displaced in opposite directions each other and separators 26 are interposed between the electrodes. The positive electrode and the negative electrode are electrically extracted from end faces 21b and 21c, respectively, of capacitor element 10.

As show in FIG. 7, bottomed, cylindrical, metallic case 11 made of aluminum that houses capacitor element 10 together with a driving electrolytic solution (not shown) has protrusion 11a provided on the inner bottom face thereof. Further, protrusion 11a is assembled so as to be fitted in hollow portion 10a of capacitor element 10. The end face of the negative electrode side of capacitor element 10 inserted in metallic case 11 is mechanically and electrically connected to the inner bottom face of metallic case 11 by such a means as laser welding. Wrung part 11b having a V-shaped section that is formed on metallic case 11 presses and holds the circumference of the end face of capacitor element 10 on the upper side in the drawing, from the outward direction.

Terminal plate 12 made of aluminum includes the following elements: positive terminal 12a for external connection that is integrally formed with terminal plate 12 on the outer side thereof; junction part 12b provided on the inner side of terminal plate 12 and connected to the end face on the positive side of capacitor element 10; and projection 12c fitted in hollow portion 10a of capacitor 10. The end face of capacitor element 10 on the positive side is mechanically and electrically connected to junction part 12b by joining, using such a means as laser welding.

Insulating ring 13 is disposed on the top end of wrung part 11b formed on metallic case 11. Insulating ring 13 is formed from the portion between the inner face of metallic case 11 and the outer peripheral surface of terminal plate 12 so as to lead to a part of the inner circumference of terminal plate 12. Thereby, insulating ring 13 keeps electrical insulation between terminal plate 12 and metallic case 11.

Ring-shaped sealing rubber 14 made of an insulating rubber is disposed along the circumference of the surface of terminal plate 12. By a process of forming curled portion 11c so that curled portion 11c is caught by the opening of metallic case 11 via sealing rubber 14 (generally referred to as a curling process), capacitor element 10 is sealed. The stress of sealing rubber 14 generated by wedging engagement of the tip of curled portion 11c to the top face of sealing rubber 14 is used to ensure air tightness and prevent fluid leakage of the driving electrolytic solution.

In the conventional capacitor, fluid leakage of the driving electrolytic solution housed in metallic case 11 together with capacitor element 10 needs to be prevented. For this purpose, terminal plate 12 is disposed in the opening of metallic case 11, and sealing is attained by curled portion 11c that is formed by curling the opening of metallic case 11 via sealing rubber 14 disposed along the circumference of the surface of terminal plate 12. However, in a capacitor mechanically sealed in this manner, capacitor element 10 generates heat, when the capacitor is used in a severe environment or conditions, or undergoes continuous life tests. A resulting increase in the temperature of the driving electrolytic solution increases the pressure in metallic case 11, and in the worst case, the fluid leakage of the driving electrolytic solution causes a short circuit.

SUMMARY OF THE INVENTION

According to the present invention, in a sealing rubber structured to have enhanced sealing properties, short circuits are prevented even in an abnormal use and the safety is enhanced.

In a capacitor in which a capacitor element is housed in a bottomed, cylindrical, metallic case together with a driving electrolytic solution, and the opening of this metallic case is sealed with a terminal plate via a sealing rubber, a projection wall for preventing a short circuit between the metallic case and the terminal plate is provided at least one of the top face and the bottom face of this sealing rubber according to the present invention.

The projection wall projecting between the metallic case and the terminal plate prevents a short circuit between the terminal plate and the metallic case connected to the positive electrode and the negative electrode thereof, respectively, even when moisture adheres on the upper side of the metallic case or the metallic case is abnormally deformed by an abnormal pressure from the lateral direction of the metallic case. Thus, an advantage of enhancing the safety even in an abnormal use can be offered.

BRIEF DESCRIPTION OF THE DRAWINGS

FIG. 1 is a top view showing an appearance of an electric double layer capacitor in accordance with an exemplary embodiment of the present invention.

FIG. 2 is a front view showing an appearance of the electric double layer capacitor in accordance with the exemplary embodiment of the present invention.

DETAILED DESCRIPTION OF PREFERRED EMBODIMENTS

FIRST EXEMPLARY EMBODIMENT

FIG. 1 is a top view and FIG. 2 is a front view both showing the appearance of an electric double layer capacitor, which is an example of a capacitor in accordance with a first exemplary embodiment of the present invention.

As shown in FIGS. 1 and 2, metallic case 1 made of aluminum and having a bottomed, cylindrical shape houses a capacitor element (not shown) together with a driving electrolytic solution (not shown) so that the bottom end face of the capacitor element thereof is in contact with the inner bottom face of metallic case 1. The inner bottom face of metallic case 1 is mechanically and electrically connected to the bottom end face of the capacitor element by such a means as leaser welding. An external terminal may be separately attached to the outer surface of metallic case 1 by such a means as laser welding.

Further, side groove wrung part 1*a* for sealing and side groove wrung part 1*b* for positioning the capacitor element are provided on the outer peripheral surface of metallic case 1.

A description is provided of a capacitor element in the Background Art. The capacitor element of this exemplary embodiment is formed by winding a pair of positive and negative sheet-shaped electrodes each of which has polarized electrode layers formed on a current collector made of an aluminum foil so that the electrodes are displaced in opposite directions each other and separators are interposed between the electrodes. Further, a hollow portion is formed in the center of the capacitor element so that the positive electrode and the negative electrode are electrically extracted from one of both end faces of the capacitor element, respectively.

As shown in FIG. 1, terminal plate 2 made of a metal, e.g. aluminum, is disposed in the opening of metallic case 1 so that the bottom face of terminal plate 2 is in contact with the top end face of the capacitor element housed in metallic case 1.

Terminal plate 2 has pressure regulating valve 2*a* for regulating the pressure inside of metallic case 1. Terminal part 2*b* that can be electrically extracted to an external device has a plane higher than the top end of metallic case 1. Thus, a connection bar is attached to terminal part 2*b*, as required.

Junction part 2*c* formed into a concave shape is shaped to project inside of the capacitor. The bottom face of terminal plate 2 and the top end face of the capacitor element can be mechanically and electrically joined to each other by such a means as laser welding from the surface of this junction part 2C.

Terminal part 2*b* is provided only in one region in three regions partitioned by three junction parts 2*c* in FIG. 1. However, a terminal part may be provided in the other two regions. At that time, when the terminal part is provided in an area including pressure regulating valve 2*a*, pressure regulating valve 2*a* is provided on terminal part 2*b*.

Figure 3A:
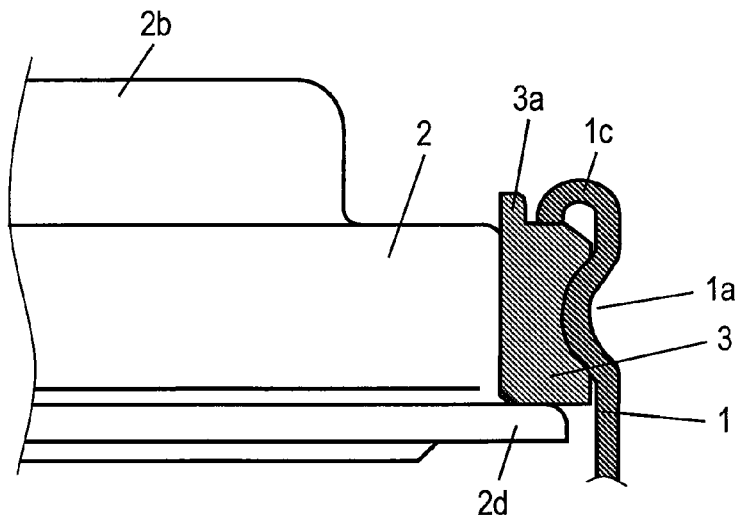
FIG. 3A is a partial sectional view of an essential part of the electric double layer capacitor in accordance with the exemplary embodiment of the present invention.

Next, a description is provided of a sealing portion, which is a feature of the present invention. FIG. 3A is a partial sectional view in which an essential part A, i.e. a sealing portion in FIG. 2, is enlarged. In FIG. 3A, only metallic case 1 and sealing rubber 3 to be described later are shown in sectional views and terminal plate 2 is shown in a front view, for ease of understanding. With reference to FIG. 3A, reference numeral 3 shows a ring-shaped sealing rubber made of an insulating rubber. To position sealing rubber 3, sealing rubber 3 is fitted onto the outer peripheral surface of terminal plate 2 in contact with flange 2*d* provided in horizontal direction along the circumference of the bottom end of terminal plate 2. Sealing rubber 3 insulates metallic case 1 from terminal plate 2. The materials usable for sealing rubber 3 include a butyl rubber (isobutylene isoprene rubber).

Sealing rubber 3 is compressed between the outer side of the side face of metallic case 1 and the outer peripheral surface by side groove wrung part 1*a* provided on the side face of metallic case 1. Thus the opening of metallic case 1 is sealed and air tightness is ensured. Further, curled portion 1*c* having an arc sectional shape formed by a process of catching the end of the opening of metallic case 1 to the inner diameter side of metallic case 1 (generally referred to as a curling process) is in press-contact with sealing rubber 3 and holds sealing rubber 3. Top projection wall 3*a* projecting between terminal plate 2 and curled portion 1*c* is formed on the top face of sealing rubber 3. Top projection wall 3*a* is provided along the whole circumference of the top face of sealing rubber 3, i.e. in a ring shape. In this manner, metallic case 1 is wrung at side groove dawn portion 1*a* from the outer side thereof. Therefore, the sealing capability between sealing rubber 3 and the outer peripheral portion of terminal plate 2 is enhanced, and thus the fluid leakage of the driving electrolytic solution in metallic case 1 can be inhibited. The thickness of sealing rubber 3 prevents terminal plate 2 from contact with metallic case 1, thus the need for using a separate insulating ring is eliminated Next, a description is provided of an advantage of top projection wall 3*a* provided on the top face of sealing rubber 3. In a conventional sealing rubber as described in the Background Art, sealing is attained by wedging engagement of a curled portion of the tip of the opening to the sealing rubber. In contrast, the exemplary embodiment of the present invention includes sealing rubber 3 that is compressed from the outer side of metallic case 1 so that the sealing properties of the sealing rubber are improved. First, a description is provided of a case where above top projection wall 3*a* is not provided in this structure.

Figure 4:
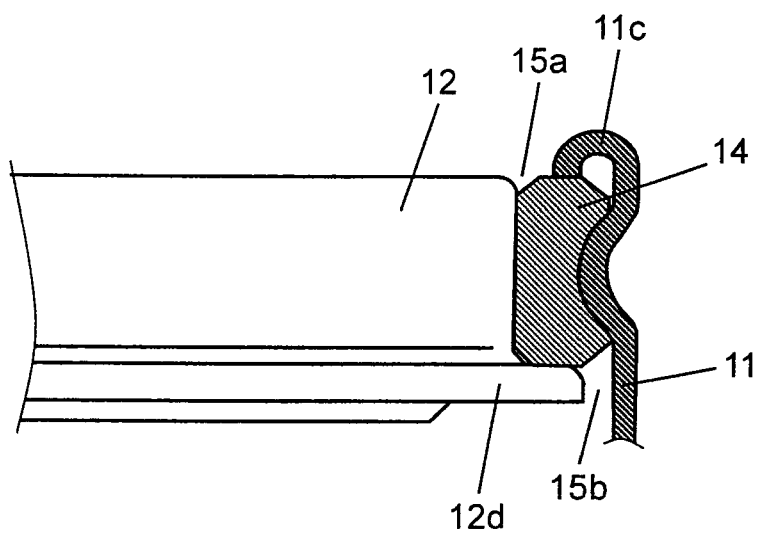
FIG. 4 is a sectional view of an electric double layer capacitor for explanation of the feature of the present invention.

FIG. 4 is a partially sectional view of a capacitor in which top projection wall 3*a* is not provided on the top face of sealing rubber 3. As shown in FIG. 4, sealing rubber 4 does not have the above projection wall. At this time, gap 15*a* is formed between terminal plate 12 and curled portion 11*c*. It is designed that gap 15*a* prevents a short circuit between metallic case 11 and terminal plate 12 in a normal use. However, in cases where moisture adheres to gap 15*a*, a short circuit can occur because terminal plate 12 and curled portion 11*c* are connected to the positive electrode and the negative electrode, respectively.

In contrast, in sealing rubber 3 as shown in FIG. 3A, top projection wall 3*a* works as an insulating barrier even under abnormal circumstances of adhesion of moisture to terminal plate 2. Thus, a short circuit between metallic case 1 and terminal plate 2 can be prevented. Thus an advantage of enhancing the safety even in an abnormal use can be offered.

The height of top projection wall 3*a* is described. When the height of top projection wall 3*a* is excessively larger than the height of terminal plate 2, the reflection of the laser during laser welding in junction part 2*c* of terminal plate 2 can melt the tip of top projection wall 3*a*. Thus, it is preferable that the height of top projection wall 3*a* is such that the extension of the line connecting the apex of top projection wall 3*a* and the apex of terminal plate 2 in the surrounding portion of junction part 2*c* does not intersect with junction part 2*c*.

Figure 3B:
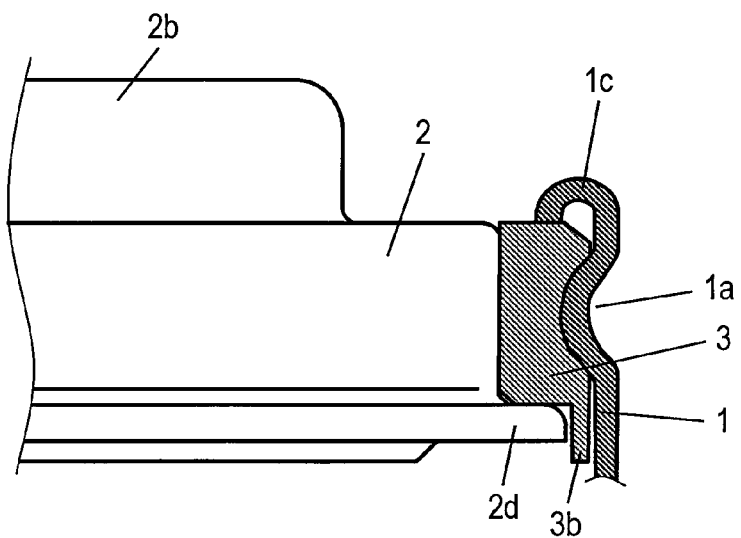
FIG. 3B is a partial sectional view of an essential part of an electric double layer capacitor in accordance with a first exemplary embodiment of the present invention.

FIG. 3B is a partially sectional view in which an essential part A, i.e. a sealing portion in FIG. 2, is enlarged. FIG. 3B is a sectional view similar to FIG. 3A. FIG. 3B is different from FIG. 3A in that, instead of top projection wall 3a, bottom projection wall 3b projecting between metallic case 1 and flange 2d of terminal plate 2 is formed on the bottom face of sealing rubber 3. Bottom projection wall 3b is also provided along the whole circumference of the bottom face of sealing rubber 3, i.e. in a ring shape.

Next, a description is provided of an advantage of bottom projection wall 3b provided on the bottom face of sealing rubber 3. In a typical design, gap 15b is provided as shown in FIG. 4 to prevent a short circuit between metallic case 11 and terminal plate 12. However, when metallic case 11 is abnormally deformed by a forced pressure applied from the lateral direction of metallic case 11, a short circuit is caused between flange 12d provided for positioning sealing rubber 14, and metallic case 11 in some cases.

In contrast, in sealing rubber 3 as shown in FIG. 3B, bottom projection wall 3b working as an insulating barrier can prevent a short circuit between metallic case 1 and terminal plate 2, even under abnormal circumstances of an abnormal pressure or distortion applied from a lateral direction of metallic case 1. Thus an advantage of enhancing safety even in an abnormal use can be offered.

Figure 3C:
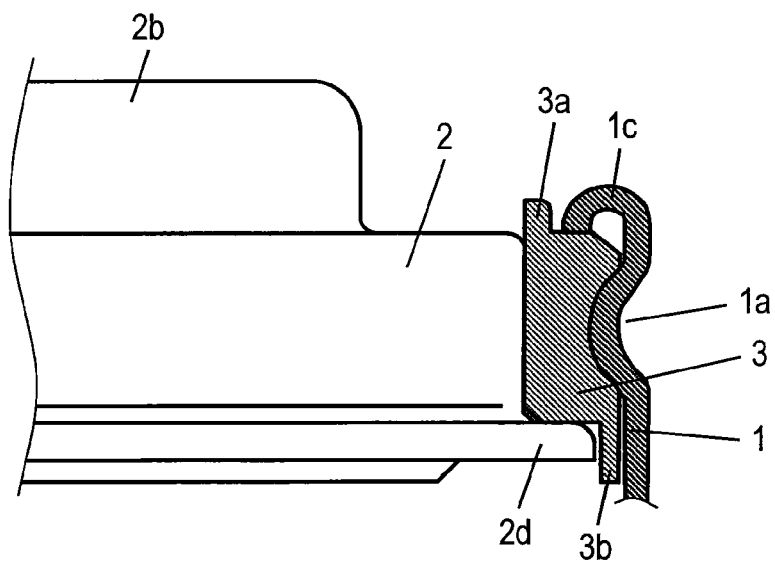
FIG. 3C is a partial sectional view of an essential part of an electric double layer capacitor in accordance with the first exemplary embodiment of the present invention.

In this exemplary embodiment, a description is provided of each of the cases where top projection wall 3a is provided on the top face of sealing rubber 3 and bottom projection wall 3b is provided on the bottom face thereof. Both of the projection walls may be provided at the same time. The advantage of preventing a short circuit is offered for each of assumed abnormal circumstances. FIG. 3C shows a sectional view of an example where projection walls are provided on both top and bottom faces.

Second Exemplary Embodiment

Figure 5:
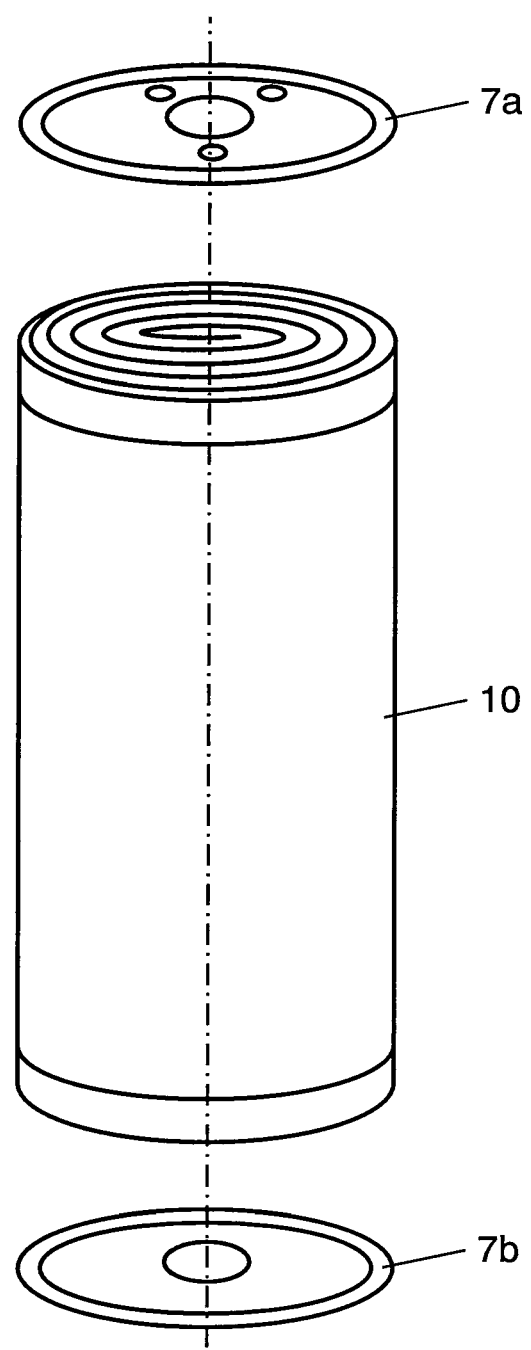
FIG. 5 is a development view of the electric double layer capacitor element in accordance with the second exemplary embodiment of the present invention.
Figure 6:
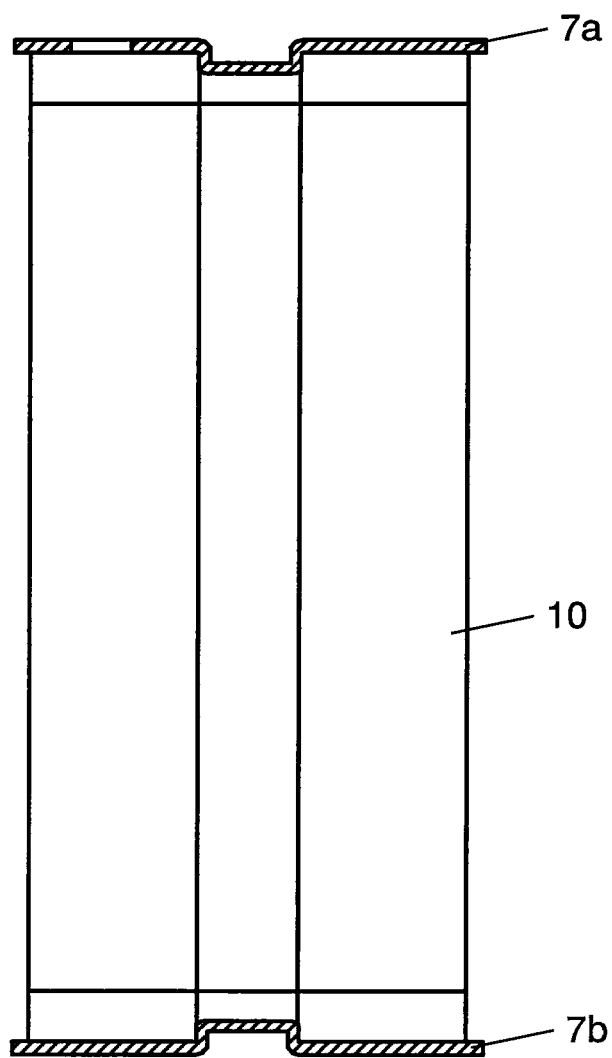
FIG. 6 is a sectional view of the electric double layer capacitor element in accordance with the second exemplary embodiment of the present invention.
Figure 7:
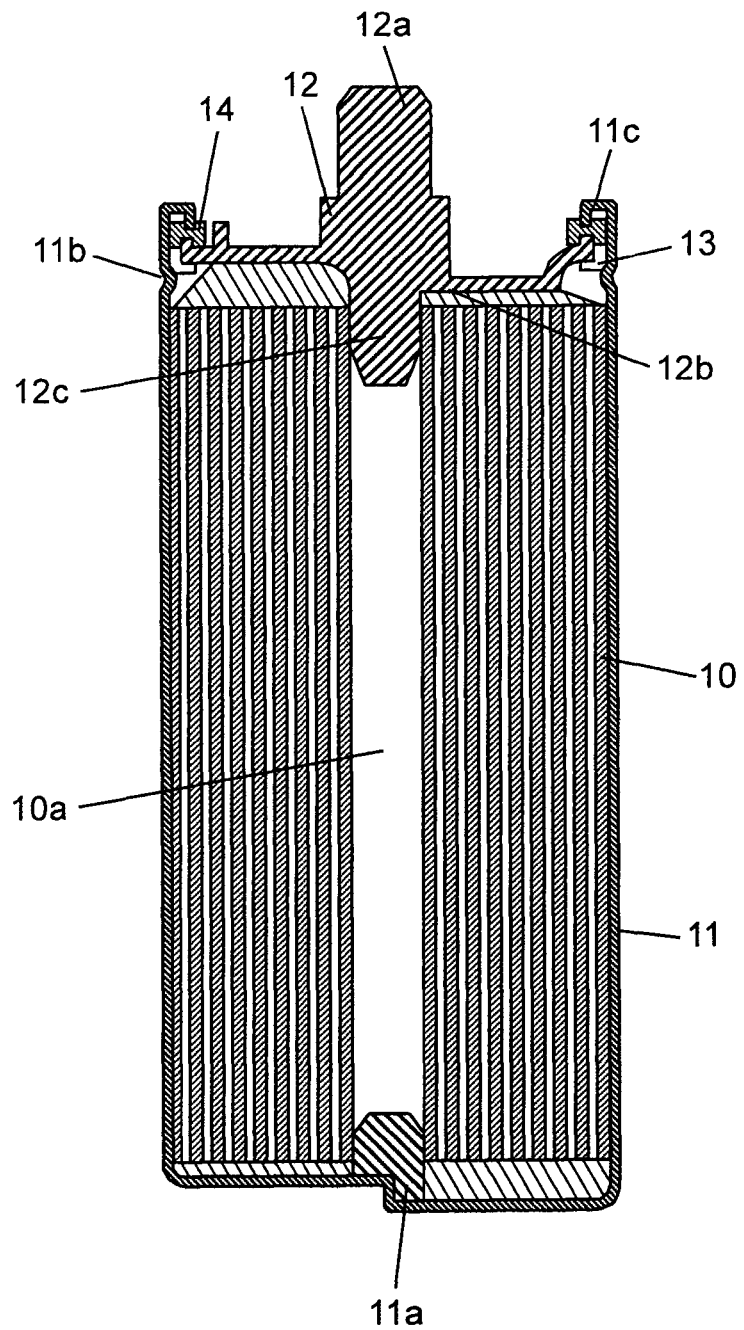
FIG. 7 is a sectional view of a typical electric double layer capacitor.
Figure 8:
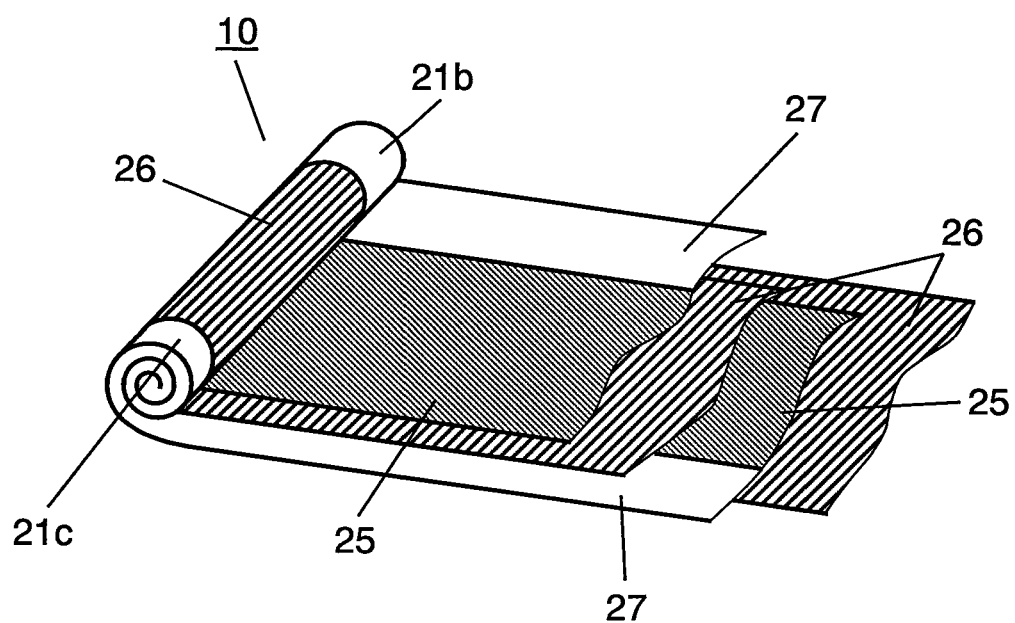
FIG. 8 is an exploded perspective view of the typical electric double layer capacitor.

FIG. 5 is a development view of an electric double layer capacitor in accordance with a second exemplary embodiment of the present invention. FIG. 6 is an exploded perspective view of the electric double layer capacitor in accordance with the second exemplary embodiment of the present invention. Current collector plate 7a and current collector plate 7b each made of metal are joined to the electrodes on both ends of capacitor element 10. FIG. 5 shows a separate state before this joining. Current collector plate 7a and current collector plate 7b are formed by processing an aluminum plate. Each collector plate is joined to capacitor element 10 by laser welding.

For capacitor element 10 to which current collector plates 7a and 7b are joined, current collector 7a is joined to the bottom face of terminal plate 2 by laser welding in a manner similar to that of the first exemplary embodiment. Current collector plate 7b is joined to the inner bottom of metallic case 1 also by laser welding. As described above, the above elements are mechanically and electrically joined together. The method of sealing is similar to that of the first exemplary embodiment.

The capacitor structured as above has the following advantages in addition to the advantage of the capacitor of the first exemplary embodiment. First, in a state where current collector plates 7a and 7b are joined to capacitor element 10, whether or not any defective joining exists can be sufficiently checked. Further, when current collector plates 7a and 7b are joined to metallic case 1, the joining operation can be easily performed. Thus the reliability related to joining can be largely improved.

Figure 3D:
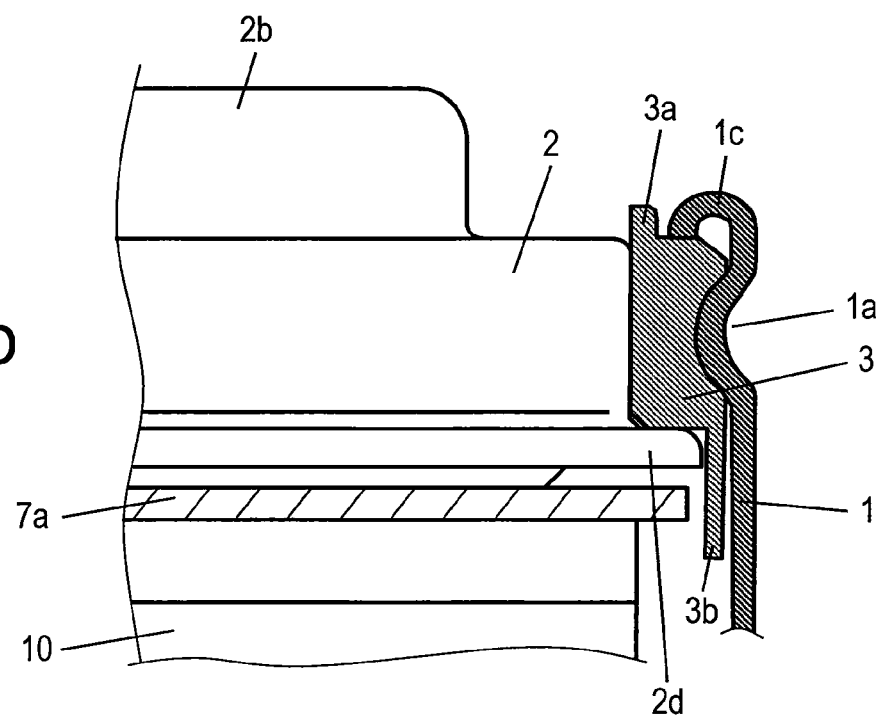
FIG. 3D is a partial sectional view of an essential part of an electric double layer capacitor in accordance with a second exemplary embodiment of the present invention.

FIG. 3D shows a partially sectional view of an essential part of an electric double layer capacitor in accordance with the second exemplary embodiment of the present invention.

FIG. 3D shows a structure substantially similar to the structure of FIG. 3C described in the first exemplary embodiment. Elements similar to those of the first exemplary embodiment in this structure have the same reference marks. Current collector plate 7a welded to capacitor element 10 is welded to the bottom face of flange 2d of terminal plate 2. Bottom projection wall 3b of sealing rubber 3 extends further downwardly from the exactly lateral side of current collector plate 7a. With this structure, even under abnormal circumstances where an abnormal pressure or deformation is applied from the lateral direction of metallic case 1, bottom projection wall 3b works as an insulating barrier, and can prevent a short circuit between metallic case 1 and current collector plate 7a. Thus an advantage of enhancing safety even in an abnormal use can be offered.

As described above, in a capacitor of the present invention, the fluid leakage of a driving electrolytic solution is prevented. Thus, the capacitor has excellent reliability and high safety even in an abnormal use. The capacitor is useful particularly in vehicle applications or the like where high reliability is required.

What is claimed is:
1. A capacitor comprising:
a capacitor element formed by winding a first sheet-shaped electrode and a second sheet-shaped electrode with a separator interposed between the electrodes, and displacing the first electrode and the second electrode in opposite directions each other;
a bottomed, cylindrical, metallic case housing the capacitor element together with a driving electrolytic solution, the first electrode being joined to the case;
a metallic terminal plate having a cylindrical section including an outer peripheral surface, and a disc-shaped flange provided along a bottom surface of the cylindrical section and extending beyond the outer peripheral surface of the cylindrical section, the second electrode being joined to the terminal plate; and
a sealing rubber in a ring shape in contact with an extended top surface of the flange of the terminal plate, the outer peripheral surface of the cylindrical section of the terminal plate, and the metallic case, the sealing rubber sealing the metallic case;
wherein the metallic case is wrung from an outer side of a side surface of the metallic case to form a side groove wrung part compressing the sealing rubber toward the outer peripheral surface of the cylindrical section of the terminal plate, an end of the opening of the metallic case is curled to an inner diameter side of the metallic case so as to form a curled portion having an arc sectional shape, and the curled portion is in press-contact with the sealing rubber; and
a single ring-shaped top projection wall is provided on a top face of the sealing rubber and located between the terminal plate and the curled portion and extends substantially parallel to the outer peripheral surface of the cylindrical section of the metallic terminal plate,
an upper tip of the ring-shaped top projection wall is as high as an upper end of the curled portion or lower than the upper end of the curled portion, and higher than an upper tip of a portion of the sealing rubber, the portion of the sealing rubber being located inside the curled portion,
an inner surface of the ring-shaped top projection wall and an inner surface of the sealing rubber lie in a same plane, and a gap is provided between an outer surface of the ring-shaped top projection wall and an inner surface of the curled portion, wherein a ring-shaped bottom projection wall projecting between the metallic case and the flange is provided on a bottom face of the sealing rubber, and wherein a gap is provided at a location, the location is at least one of a location between the ring-shaped bottom projection wall and the metallic case and a location between the ring-shaped bottom projection wall and the flange.

2. The capacitor according to claim 1, wherein a first metallic current collector plate is joined to the first electrode of the capacitor element, the metallic case is joined to the capacitor element via the first current collector plate, a second metallic current collector plate is joined to the second electrode of the capacitor element, and the terminal plate is joined to the capacitor element via the second current collector plate.

3. The capacitor according to claim 2, wherein a bottom projection wall that projects between the second current collector plate joined to the terminal plate and the metallic case is further provided on a bottom face of the sealing rubber.

4. The capacitor according to claim 1, wherein the side groove wrung part is faced to the outer peripheral surface of the terminal plate through the sealing rubber.

5. The capacitor according to claim 1, wherein an inner surface of the side groove wrung part is in contact with an outer peripheral surface of the sealing rubber.

6. The capacitor according to claim 1, wherein the ring-shaped top projection wall projects between the terminal plate and the curled portion.

7. The capacitor according to claim 1, wherein the upper tip of the ring-shaped top projection wall falls within a thickness of the case at the upper end of the curled portion in a vertical direction.

8. A capacitor comprising:
a capacitor element formed by winding a first sheet-shaped electrode and a second sheet-shaped electrode with a separator interposed between the electrodes, and displacing the first electrode and the second electrode in opposite directions each other;
a bottomed, cylindrical, metallic case housing the capacitor element together with a driving electrolytic solution, the first electrode being joined to the case;
a metallic terminal plate having a cylindrical section including an outer peripheral surface, and a disc-shaped flange provided along a bottom surface of the cylindrical section and extending beyond the outer peripheral surface of the cylindrical section, the second electrode being joined to the terminal plate; and
a sealing rubber in contact with an extended top surface of the flange of the terminal plate, the outer peripheral surface of the cylindrical section of the terminal plate, and the metallic case, sealing rubber sealing the metallic case;
wherein the metallic case is wrung from an outer side of a side surface of the metallic case to form a side groove wrung part compressing the sealing rubber toward the outer peripheral surface of the cylindrical section of the terminal plate, an end of the opening of the metallic case is curled to an inner diameter side of the metallic case so as to form a curled portion having an arc sectional shape, and the curled portion is in press-contact with the sealing rubber,
a ring-shaped bottom projection wall projecting between the metallic case and the flange is provided on a bottom face of the sealing rubber, and
a gap is provided at a location, the location is at least one of a location between the ring-shaped bottom projection wall and the metallic case and a location between the ring-shaped bottom projection wall and the flange.

* * * * *